April 8, 1924.
M. ZAWISTOWSKI ET AL
1,489,652
DRINK MIXER
Filed Aug. 22, 1922
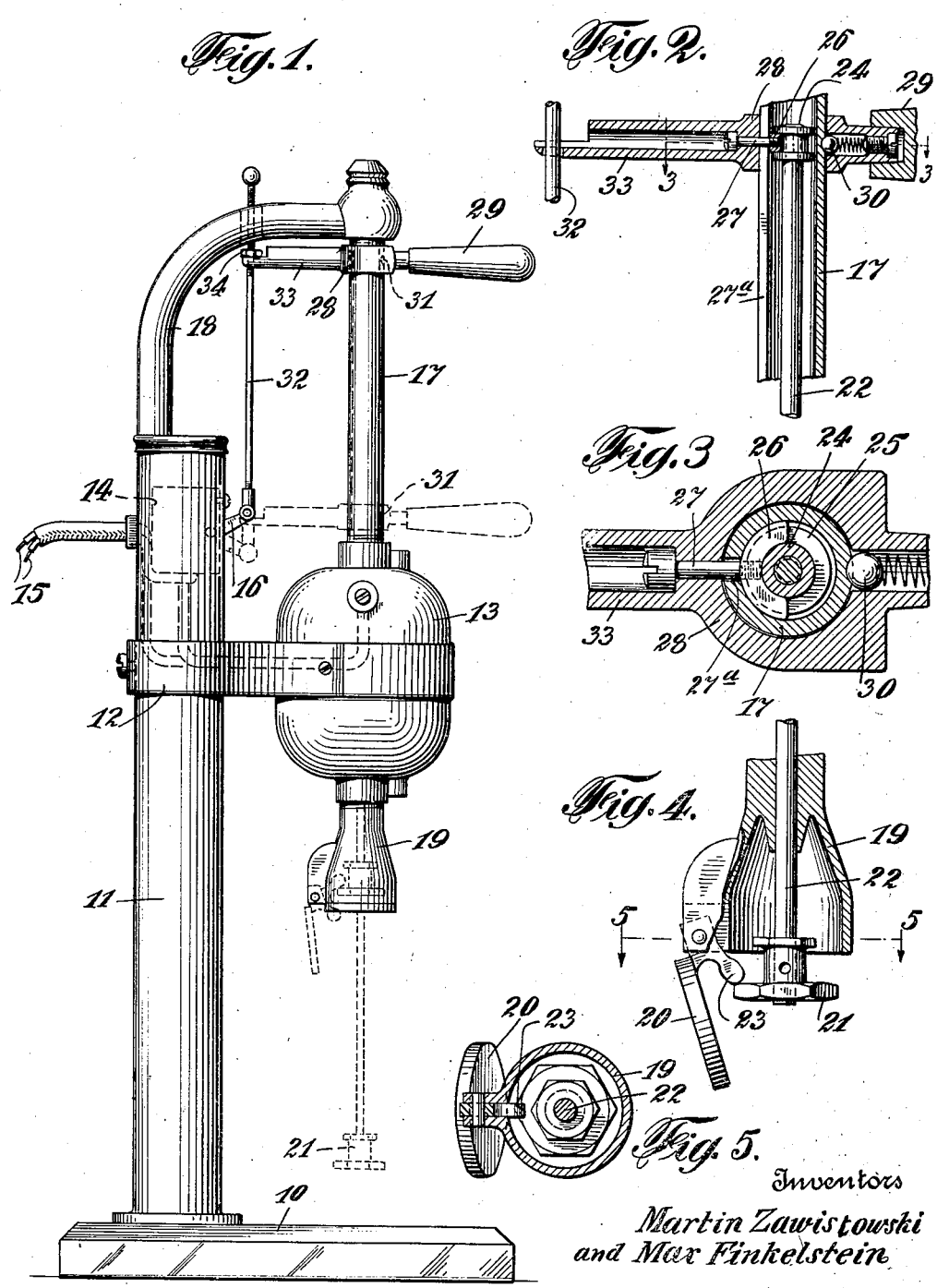
Inventors
Martin Zawistowski
and Max Finkelstein
By Dean Fairbanks Obright & Hirsch
their Attorneys Patented Apr. 8, 1924.

1,489,652

UNITED STATES PATENT OFFICE.

MARTIN ZAWISTOWSKI, OF HUNTINGTON, AND MAX FINKELSTEIN, OF NEW YORK, N. Y.

DRINK MIXER.

Application filed August 22, 1922. Serial No. 583,528.

*To all whom it may concern:*

Be it known that we, MARTIN ZAWISTOWSKI and MAX FINKELSTEIN, both citizens of the United States, the former a resident of Huntington, county of Suffolk, State of New York, and the latter a resident of New York, county of Bronx, and State of New York, have invented certain new and useful Improvements in Drink Mixers, of which the following is a specification.

This invention is an improvement in a stirring apparatus, and its perfected improvement is intended primarily for use in stirring and mixing the ingredients of potable liquids such as are dispensed at soda fountains and such places. Devices of this character usually have a stirrer which may be introduced into the drinking-glass or any special container, and rotated at high speed from a suitable source of power, which is preferably, a small electric motor.

One of the main objects of our invention is to provide means which will conceal the stirrer when the latter is not in use, and will protect it from dust, flies and other sources of contamination. A further object is to provide a protecting casing which opens automatically upon the act of projecting the stirrer into the liquid and closes after withdrawing it from the liquid. The further object is to provide an improved means for starting and stopping the motor upon moving the stirrer into and out of operative position. Other objects and advantages will be pointed out hereinafter, or will be apparent from a consideration from a preferred embodiment illustrated in the accompanying drawing.

In these drawings:—

Fig. 1, is a side elevation of a device constructed in accordance with our invention, the operating parts being shown in solid lines in raised position, and in dotted lines in lowered or operative position;

Fig. 2, is a vertical section of a detail, and on a larger scale;

Fig. 3, is a transverse section on the line 3—3 of Fig. 2, and on a still larger scale;

Fig. 4, is a section showing the stirrer receiving casing; and,

Fig. 5, is a transverse section on the line 5—5 of Fig. 4.

In the construction illustrated there is provided a base 10, upon which may be placed a drinking glass, or any special receptacle containing the liquid, or mixture which is to be stirred or agitated. The base 10 carries a standard 11, which latter has a bracket 12, carrying a source of power or prime mover such as an electric motor 13. The motor may be of any suitable type, and is preferably mounted with its armature-shaft extended vertically, and disposed above the base 10. Within the upper portion of the standard 11, there is provided any suitable form of switch 14, for controlling the current of the motor. The feed wires 15, are indicated as entering the back of the standard 11, and passing from the switch down through the standard to the bracket 12, and then to the motor, so that the wiring is concealed and protected, and is not liable to be wet or the current short-circuited in washing the apparatus, or by liquid spattering upon it. We have not illustrated the details of the switch as they form no portion of our invention. The switch is illustrated as being operated by a pivoted switch lever 16.

Extending vertically from the motor casing, there is provided a tube 17, the upper end of which is held rigid in respect to the standard 11, by a bracket or arm 18. At the lower end of the motor casing, there is provided a casing 19, which has the pivoted cover 20, adapted to close and open lower end of the casing. This casing is adapted to receive the stirrer and conceal and protect the latter when said stirrer is not in use. The stirrer illustrated is merely a hexagonal head 21, mounted on a vertically movable rod 22, but the details of the stirrer per se are no part of our invention. The rod is rotatable with the armature-shaft but free to slide endwise therethrough, there being a suitable key and key-way not shown. Thus the stirrer is rotated by the motor, but may be raised or lowered in respect to the motor and the vessel.

The cover for the lower end of the casing 19, 20 in the path of vertical movement is provided with a lug or finger 23, of the stirrer 21. The cover 20, remains open by gravity when the stirrer is in use; that is the position shown in dotted lines in Fig. 1. As the stirrer is raised into the position shown in Fig. 4, it engages with the underside of the finger 23, and further upward movement of the stirrer moves this finger upwardly, and swings the closure 20, about its pivot and carries it to closed position as indicated in solid line in Fig. 1. Thus the stirrer, when in raised position, is entirely concealed and protected within the casing and the entrance opening of the casing is tightly closed by the closure 20.

When it is desired to use the stirrer, the initial downward movement of the stirrer permits the finger 23, to follow on the upper side of the stirrer, and the cover to move in advance of the stirrer until it reaches its full open position; thus the stirrer never directly contacts with any portion of the cover which is normally exposed or upon which dirt, flies or other forms of contamination may collect.

The apparatus is so designed that in raising and lowering the stirrer, the current to the motor is turned on and off. The rod 22, projects through the armature-shaft, and upwardly within the tube 17, and is provided with a head 24, at its upper end. This head has an annular groove 25, within which is mounted a yoke stud or other part 26.

This yoke is connected by a screw 27 to a collar 28, slidably mounted on the tube 17, the screw 27 projecting through a longitudinal slot 27ª in the tube. Thus by raising and lowering the collar 28, the rod 22 may be raised and lowered but without interfering with the free rotation of said rod. Any suitable means may be employed for conveniently moving this collar, as for instance a handle 29. Within this handle there is provided a stop in the form of a spring-pressed ball 30 acting against the side of the tube 17, and adapted to enter either one of a pair of notches or recesses in the tube so as to hold the collar in either of two definite pre-determined positions, but more particularly to hold the collar in raised position against the weight of the vertically movable parts.

The switch lever 16, is connected to a vertical rod 32, the upper end of which is guided in the arm 18. The collar 28, is provided with an arm 33, which may engage with a stop 34, at the upper end of the rod 32, or with a stop, or the end of the switch lever 16 at the lower end of the rod 32. Thus in grasping the handle 29 and lifting it, the stirrer is raised out of the liquid, and when the stirrer approaches its upper limiting position, the arm 33 engages with the stop 34 and pulls up the rod 32 to shut off the current to the motor. This permits the stirrer to spin until after it rises to a position slightly above the level of the liquid so that, liquid remaining on the stirrer is thrown off before the stirrer passes above the upper edge of the glass, and before it enters the casing 19. Further upward movement closes the casing. Upon a downward movement of the handle 19, the stirrer is lowered into the liquid, and as it approaches its lower limiting position, the arm 33 engages with the end of the switch-lever 16, or with a stop on the rod 32, and lowers the switch-lever to turn on the current and start the rotation of the stirrer.

From the foregoing it will be seen that by the operation of the single handle 29, the stirrer is raised and lowered, the motor is stopped and started, and the stirrer receiving casing is opened and closed.

Various changes may be made in the details of construction, and within the spirit of our invention, without departing from the scope thereof.

For instance,—the armature-shaft itself may be made of telescopic parts so that the extension of the shaft carries the stirrer down into the liquid; the tube 17 might be entirely omitted, and the rod 22 might be guided directly in the upper end of the arm 18. Various other changes might be made.

Having thus described our invention, what we claim and desire to secure by Letters Patent, is:—

1. A device of the class described including a rotatable stirrer vertically movable into and out of operative position, and a casing open at its lower end, and into which the stirrer is lifted when in raised position. and means for closing the lower end of the casing.

2. A device of the class described including a rotatable stirrer vertically moveable into and out of operative position, a casing having an open lower end adapted to receive the stirrer when the latter is in raised position, and a cover for closing the lower end of the casing when the stirrer is in the latter.

3. A device of the class described including a rotatable stirrer vertically moveable into and out of operative position, a casing having an open lower end, and adapted to receive the stirrer when the latter is in raised position, and a cover for closing the lower end of the casing, when the stirrer is in the latter, said cover being automatically moved to closed position by the vertical movement of the stirrer itself.

4. A device of the class described, including a stirrer, a casing, having an open lower end, a rotatable rod slidably mounted within said casing, and carrying said stirrer, and a cover hinged to said casing, and having means in the path of movement in the stirrer for swinging the closure to closed position upon the movement of the stirrer into the casing.

5. In combination, an electric motor having a vertically disposed armature-shaft, a stirrer, a rod slidably mounted in said armature-shaft, and rotatable therewith, and supporting said stirrer, a switch for said motor, a handle for raising and lowering the rod, and means in the path of movement of said handle for operating said switch.

6. In combination, an electric motor, a longitudinally slotted tube secured to the casing thereof and extending upwardly therefrom, a rod projecting axially through the armature-shaft and having a head disposed within said tube, a switch for controlling the motor, a collar slidably mounted on said tube and connected with said head, whereby sliding movement of the collar moves the rod endwise, and means for operating said switch upon sliding movement of the collar.

7. In combination, an electric motor, a rod slidably mounted for axial movement in the armature-shaft thereto, a handle connected to one end of said rod for moving the latter endwise, and a switch for controlling the motor, and operated upon a predetermined movement of said handle.

8. A drink mixer including a stirrer, an electric motor for rotating the same, a casing within which the stirrer is normally positioned when out of operation, a closure for said casing, a handle and means for opening the switch to stop the motor, raising the stirrer into said casing, and closing said closure upon a predetermined movement of said handle.

Signed at New York, in the county of New York and State of New York, this 17th day of August, 1922.

MARTIN ZAWISTOWSKI.
MAX FINKELSTEIN.